United States Patent
Matsumoto et al.

(10) Patent No.: US 7,833,921 B2
(45) Date of Patent: Nov. 16, 2010

(54) COMPOSITE MATERIAL AND METHOD OF MANUFACTURING THE SAME

(75) Inventors: Akio Matsumoto, Fukuoka-ken (JP); Shogo Shimada, Fukuoka-ken (JP)

(73) Assignee: Toto Ltd., Fukuoka (JP)

( * ) Notice: Subject to any disclaimer, the term of this patent is extended or adjusted under 35 U.S.C. 154(b) by 33 days.

(21) Appl. No.: 12/384,481

(22) Filed: Apr. 3, 2009

(65) Prior Publication Data

US 2009/0295048 A1   Dec. 3, 2009

Related U.S. Application Data

(60) Provisional application No. 61/055,467, filed on May 23, 2008.

(30) Foreign Application Priority Data

| Apr. 4, 2008 | (JP) | ............................. 2008-097984 |
| Apr. 4, 2008 | (JP) | ............................. 2008-097997 |
| Feb. 3, 2009 | (JP) | ............................. 2009-022432 |
| Feb. 3, 2009 | (JP) | ............................. 2009-022433 |

(51) Int. Cl.
  C04B 35/65   (2006.01)
  C04B 35/56   (2006.01)
  C04B 35/567  (2006.01)

(52) U.S. Cl. ......................................... 501/91; 501/93

(58) Field of Classification Search ............... 501/91, 501/93
See application file for complete search history.

(56) References Cited

U.S. PATENT DOCUMENTS

| 3,725,015 A | | 4/1973 | Weaver |
| 3,796,564 A | * | 3/1974 | Taylor et al. ............... 264/29.1 |
| 3,857,744 A | | 12/1974 | Moss |
| 4,104,062 A | | 8/1978 | Weaver |
| 5,019,430 A | * | 5/1991 | Higgins et al. ........... 427/430.1 |
| 5,998,318 A | * | 12/1999 | Takanami et al. ............. 501/90 |
| 2009/0256112 A1 | * | 10/2009 | Shimada et al. ........ 252/182.32 |

FOREIGN PATENT DOCUMENTS

| JP | 2001342069 | 12/2001 |
| JP | 2002-160975 | 6/2002 |
| JP | 2002-167278 | 6/2002 |
| JP | 2003-109892 | 4/2003 |
| JP | 2003-201178 | 7/2003 |
| JP | 2007-513854 | 5/2007 |

* cited by examiner

*Primary Examiner*—Karl E Group
(74) *Attorney, Agent, or Firm*—Carrier Blackman & Associates, P.C.; Joseph P. Carrier; William D. Blackman (57) ABSTRACT

A composite material according to the invention includes X parts by volume of boron carbide, Y parts by volume of silicon carbide, and Z parts by volume of silicon as main components, wherein 10<X<60, 20<Y<70, and 5<Z<30 are satisfied, and grains of 10 μm or more of the boron carbide and the silicon carbide are 10-50 parts by volume.

7 Claims, 3 Drawing Sheets

FIG. 1

CALCINATION HEAT CURVE

REACTION SINTERING HEAT CURVE

COMPOSITE MATERIAL AND METHOD OF MANUFACTURING THE SAME

CROSS-REFERENCE TO RELATED APPLICATIONS

This application is based upon and claims the benefit of priorities from the prior Japanese Patent Application No. 2008-097984, filed on Apr. 4, 2008, the prior Japanese Patent Application No. 2008-097997, filed on Apr. 4, 2008, the prior Japanese Patent Application No. 2009-022432, filed on Feb. 3, 2009, the prior Japanese Patent Application No. 2009-022433, filed on Feb. 3, 2009, and U.S. Provisional Application No. 61/055,467, filed May 23, 2008; the entire contents of which are incorporated herein by reference.

BACKGROUND OF THE INVENTION

1. Field of the Invention

Embodiments of this invention generally relate to a composite material having boron carbide, silicon carbide, and silicon as main components and to a method for manufacturing the composite material, and particularly relate to the composite material that has high specific rigidity and that can be manufactured at low cost and to the method for manufacturing the composite material.

2. Description of the Related Art

The specific rigidity is a parameter that is Young's modulus divided by specific gravity (ratio by weight for water), and a material which has high specific rigidity is occasionally required for various machine components. The examples thereof include, a three-dimension-measuring device and a linearity-measuring device which are devices with movable body requiring positioning functions of high accuracy, and an exposure apparatus for forming a pattern on a planar body. In particular, the exposure apparatus to manufacture a semiconductor wafer or a liquid crystal panel or the like has been required to have the positioning function of further higher accuracy satisfying the requirement of miniaturization of the pattern in recent years, and it has also been required to improve its through-put by moving at high speed a movable body such as a static pressure fluid bearing device on which a work to be exposed or a reticle is mounted, for economically forming a pattern.

However, to move such a movable body at high speed is necessarily to generate vibration, and this is a negative factor for the positioning accuracy. For quickly attenuating the vibration, a material with high specific rigidity is required, and for moving the movable body at high speed under a constant driving force, weight saving of movable parts is required, and bending of the apparatus leads to lowering of the positioning accuracy, and also therefore, a material with large Young's modulus and small specific gravity has been required.

As such machine parts requiring high specific rigidity, conventionally, metal materials such as iron and steel have been used. However, recently, alumina ceramics with higher specific rigidity has been used. However, in the case that further higher specific rigidity is required, it is necessary to use not oxide ceramics such as alumina but non-oxide ceramics. And among them, a boron-carbide-based material having the maximum specific rigidity as an industrial material is being expected.

As the boron-carbide-based material, the highest specific rigidity is expected in an approximately pure boron carbide sintered body, but boron carbide is known as a material difficult to be sintered. Accordingly, a conventional boron carbide sintered body has been manufactured by hot pressing. However, in the hot pressing sintering method, it is difficult to manufacture a product with large size and complex shape, and moreover, cost of the hot pressing apparatus or mold for providing high temperature and high pressure is large and therefore the method cannot be a method for realistically manufacturing the structural members.

For solving this problem, a technique of slip casting and pressureless sintering of boron carbide has been disclosed (see, for example, Patent Document 1, Patent Document 2, Patent Document 3, Patent Document 4, Patent Document 5, Patent Document 6). However, in this method, because the sintered body has difficult grindability, there are problems that grinding cost is larger for in use application requiring high accuracy of size such as semiconductor and liquid crystal manufacturing apparatuses, and that sintering cost is larger because the pressureless sintering temperature is 2200° C. or more, which is considerably high.

Accordingly, there has been disclosed a material in which the boron carbide is not sintered but a boron carbide powder is dispersed as a filler in a metal matrix phase (see, for example, Patent Document 7). In this material, boron carbide is dispersed in aluminum. However, because wettability between boron carbide and aluminum is bad, it is manufactured by hot pressing the mixture of boron carbide and aluminum, and in hot pressing, a product with large size and complex shape cannot be produced and the manufacturing cost is large, and therefore, the method cannot be a method for realistically manufacturing the structural members.

Accordingly, there have been disclosed composite materials each in which silicon whose wettability with boron carbide is relatively excellent is used as a metal matrix and the melted silicon is impregnated into the boron carbide molded body (see, for example, Patent Document 8, Patent Document 9, Patent Document 10). Among them, there is an example including a raw material that can be a small amount of carbon source as the primary material. However, in this method, because boron carbide is highly filled in the composite material although silicon is impregnated, the difficult grindability is not changed although the grindability is improved slightly more than that of the boron carbide. Moreover, because silicon is filled in the gap of the molded body having boron carbide as the main component, the completed composite material comes to contain a large amount of silicon, and such material has a low specific rigidity, and. the high specific rigidity of boron carbide cannot be applied.

Moreover, there have been disclosed composite material: each in which silicon carbide in addition to boron carbide is contained as a raw material of the molded body, and melted silicon is impregnated into the molded body (see, for example Patent Document 11). Among them, there is an example including a raw material that can be a small amount of carbon source as the primary material. However, in this method, all the same, because boron carbide and silicon carbide are highly filled in the composite material, the difficult grindability is not changed although the grindability is improved slightly more than that of the boron carbide. Moreover, because silicon is filled in the gap of the molded body having boron carbide and silicon carbide as the main components, the completed composite material comes to contain a large amount of silicon and such material has a low specific rigidity, and the high specific rigidity of boron carbide cannot be applied.

Patent Document: International publication WO 01/72659A1 pamphlet (Page 15-16)

Patent Document: JP-A 2001-342069 (Kokai) (Page 3-4)

Patent Document: JP-A 2002-160975 (Kokai) (Page 4-6)

Patent Document: JP-A 2002-167278 (Kokai) (Page 46)
Patent Document: JP-A 2003-109892 (Kokai) (Page 3-5)
Patent Document: JP-A 2003-201178 (Kokai) (Page 4-9)
Patent Document: U.S. Pat. No. 4,104,062 specification (col 2-5)
Patent Document: U.S. Pat. No. 3,725,015 specification (col 2-6
Patent Document: U.S. Pat. No. 3,796,564 specification (col 2-13)
Patent Document: U.S. Pat. No. 3,857,744 specification (col 1-3)
Patent Document: JP-A 2007-51384 (Kohyo) specificatioin (page 20-22).

SUMMARY OF THE INVENTION

According to an aspect of the invention, there is provided a composite material including X parts by volume of boron carbide, Y parts by volume of silicon carbide, and Z parts by volume of silicon as main components, $10<X<60$, $20<Y<70$, and $5<Z<30$ being satisfied, and grains of 10 μm or more of the boron carbide and the silicon carbide being 10-50 parts by volume.

DETAILED DESCRIPTION OF THE INVENTION

An embodiment of the invention is a composite material including X parts by volume of boron carbide, Y parts by volume of silicon carbide, and Z parts by volume of silicon as main components, $10<X<60$, $20<Y<70$, and $5<Z<30$ being satisfied, and grains of 10 μm or more of the boron carbide and the silicon carbide being 10-50 parts by volume. According to this composite material, high specific rigidity and excellent grindability can be obtained.

Moreover, in a preferable embodiment of the invention, a specific rigidity of the composite material is 130 GPa or more.

Moreover, another embodiment of the invention is a method for manufacturing a composite material, including: a molding step of molding a molded body by using a raw material having boron carbide, silicon carbide, and a carbon source as main components; and a reaction sintering step of impregnating molten silicon into the molded body to transform the carbon into silicon carbide, a composite material mainly made of X parts by volume of boron carbide, Y parts by volume of silicon carbide, and Z parts by volume of silicon being formed, where $10<X<60$, $20<Y<70$, and $5<Z<30$ are satisfied and grains of 10 μm or more of the boron carbide and the silicon carbide account for 10-50 parts by volume. According to this method, a composite material having high specific rigidity and excellent grindability can be manufactured.

Moreover, another embodiment of the invention is a method for manufacturing a composite material, including: a reaction sintering step of impregnating molten silicon into a molded body molded by using a raw material having boron carbide, silicon carbine, and a carbon source as main components to transform the carbon into silicon carbide, a composite material mainly made of X parts by volume of boron carbide, Y parts by volume of silicon carbide, and Z parts by volume of silicon being formed, where $10<X<60$, $20<Y<70$, and $5<Z<30$ are satisfied and grains of 10 μm or more of the boron carbide and the silicon carbide account for 10-50 part by volume. According to this method, a composite material having high specific rigidity and excellent grindability can be manufactured.

Moreover, in a preferable embodiment of the invention, a specific rigidity of the composite material is 130 GPa or more.

Moreover, a preferable embodiment of the invention is a method for manufacturing the composite material wherein the carbon source includes a carbon powder as its main component. According to this method, the specific rigidity and the grindability can be further improved.

Moreover, a preferable embodiment of the invention is a method for manufacturing the composite material wherein the carbon source further includes a resin component as its main component. According to this method, the specific rigidity and the grindability can be further improved.

Moreover, a preferable embodiment of the invention is a method for manufacturing the composite material including a calcination step of the molded body between the molding step and the reaction sintering step. According to this method, generation of a defect in reaction sintering can be prevented.

Moreover, a preferable embodiment of the invention is a method for manufacturing the composite material wherein the molding method of the molding step is slip casting in which water is used as the solvent. According to this method, a product with large size and complex shape can be manufactured.

Moreover, a preferable embodiment of the invention is a method for manufacturing the composite material wherein a filling ratio of the molded body in the molding step is 60-80%. According to this method, generation of a defect in molding and reaction sintering can be prevented.

Moreover, another embodiment of the invention is a method for manufacturing a composite material, including: a molding step of molding a molded body having a filling ratio of 60-80% by using a raw material having boron carbide, silicon carbide, and a carbon source as main components; and a reaction sintering step of impregnating molten silicon into the molded body to transform the carbon into silicon carbide, a composite material mainly made of boron carbide, silicon carbide, and silicon being formed, According to this method, a composite material having high specific rigidity and excellent grindability can be manufactured.

Moreover, another embodiment of the invention is a method for manufacturing a composite material, including: a reaction sintering step of impregnating molten silicon into a molded body molded by using a raw material having boron carbide, silicon carbide, and a carbon source as main components so that a filling ratio of the molded body is 60-80%, to transform the carbon into silicon carbide, a composite material mainly made of boron carbide, silicon carbide, and silicon being formed. According to this method, a composite material having high specific rigidity and excellent grindability can be manufactured.

Moreover, in a preferable embodiment of the invention, a specific rigidity of the composite material is 130 GPa or more.

Hereinafter, main terms in the invention will be described.

(Specific Rigidity)

Specific rigidity is a value of Young's modulus divided by specific gravity, and the specific gravity is a density ratio with respect to water and therefore does not have a unit, and therefore, the unit of the specific rigidity is the same as the unit of Young's modulus. Young's modulus is measured by a resonance method, and the specific gravity is measured by Archimedes' method.

(Grain Diameter)

The grain diameter of grains in a composite material means the maximum diameter of each grain when a cut surface of the composite material is lapped and observed by an optical microscope.

(Coarse Grain)

This means a grain having the grain diameter of 10 μm or more.

(Fine Grain)

This means a grain having the grain diameter of less than 10 μm.

(F1)

This means a volume fraction of solid components in slurry when slip casting is adopted in the process of manufacturing a composite material according to the invention.

(F3)

This means a filling ratio of the solid content of the molded body in the process of manufacturing a composite material according to the invention and is measured by Archimedes' method.

(F3')

This Means a Ratio that the Vaporizing Content Part is Excluded from the filling ratio of the solid content of the molded body in the process of manufacturing the composite material according to the invention, and the part of the vaporizing content part is calculated from the raw material recipe.

The composite material in one embodiment of the invention has a structure in which silicon is filled in the gap of the grain having boron carbide and silicon carbide as main components. The boron carbide of this composite material is added as a main component of the raw material as a boron carbide powder from the molding step. Moreover, the silicon carbide of this composite material is composed of silicon carbide added as a silicon carbide powder which is a main component of the raw material from the molding step (hereinafter, referred to as the initial injected silicon carbide), and silicon carbide generated by reaction between the carbon source in the molded body and silicon (hereinafter, referred to as reaction generated silicon carbide).

The method for manufacturing a composite material in one embodiment of the invention includes a reaction sintering step of impregnating molten silicon into a molded body having boron carbide, initial injected silicon carbide, and a carbon source as main components to react the carbon source with the silicon to generate the reaction generated silicon carbide, and impregnated silicon is filled into the gap among the boron carbide, the initial injected silicon carbide, and the reaction generated silicon carbide. Moreover, the composite material in the invention is characterized in that volume fraction of grains of 10 μm or more of the boron carbide and the initial injected silicon carbide is 10-50 part by volume, and by adopting such a structure, both of high specific rigidity and excellent grindability can be satisfied.

Accordingly, the composite material in one embodiment of the invention is applied suitably to products requiring high specific rigidity and also requiring precise grinding.

Hereinafter, detail of the materials and steps in one embodiment of the invention will be explained.

The composite material in one embodiment of the invention includes X parts by volume of boron carbide, Y parts by volume of silicon carbide, and Z parts by volume of silicon as main components, in which the entirety of the composite material is 100 parts by volume, and $10<X<60$, $20<Y<70$, and $5<Z<30$ are satisfied. If the amount of the boron carbide is 10 or less parts by volume, the composite material cannot obtain the sufficient specific rigidity, and if 60 or more parts by volume, grindability of the composite material lowers. Moreover, when the grindability is emphasized, $10<X<50$ is further preferable. Moreover, if the amount of the silicon carbide is 20 or less parts by volume, the composite material cannot obtain the sufficient specific rigidity, and if 70 or more parts by volume, grindability of the composite material lowers. Moreover, when the specific rigidity is emphasized, $30<Y<70$ is further preferable, and when the grindability is emphasized, $20<Y<65$ is further preferable. Moreover, in the composite material having a silicon amount of 5 or less parts by volume, disadvantages may be caused that cracks are generated in the reaction sintering step or that voids in which silicon is not impregnated are generated, and if 30 or more parts by volume, the specific rigidity of the composite material lowers. In products to be manufactured particularly carefully not to generate a crack such as products with thick walls and large sizes, $10<Z<30$ is further preferable.

The volume fraction of grains of 10 μm or more of the boron carbide and the silicon carbide of the composite material in one embodiment of the invention is 10-50 parts by volume, and if less than 10 parts by volume, the composite material cannot obtain the sufficient specific rigidity, and if more than 50 parts by volume, grindability of the composite material lowers. Here, it is preferable that the grains of 10 μm or more are, the entirety of the boron carbide powder added as a raw material, or the entirety of the boron carbide powder added as a raw material and some of the initial injected silicon carbide powder added as a raw material.

It is preferable that the average grain diameter of the boron carbide powder that is a raw material for manufacturing the composite material in one embodiment of the invention is from 10 μm to 200 μm, and further preferably, from 20 μm to 100 μm. If the average grain diameter of the boron carbide powder is 10 μm or less, cracks are easily generated in the sintered body in the reaction sintering step, and for preventing the crack generation, it is preferable that the average grain diameter is 20 μm or more. Moreover, if the average grain diameter of boron carbide is 200 μm or more, grindability of the composite material becomes bad, and for preventing the grindability from becoming bad, it is desirable that the average grain diameter is 100 μm or less.

The grain diameter of the boron carbide powder used as a raw material and the grain diameter of the boron carbide grain in the composite material correspond approximately to each other. However, the boron carbide grain in the composite material is thought to be covered with the reacted product on the surface thereof by the reaction with the impregnated silicon, and the surface of the boron carbide grain observed by SEM is covered with a layer having a slightly different contrast. The boron carbide grain of the composite material in one embodiment of this invention and its grain diameter is defined including the surface layer composed of the reacted product. The reason why cracks are generated in the reaction sintering step if the fine grain of the boron carbide powder is used is presumed that the ratio of the layer composed of the reacted product in the surface thereof becomes significantly large with respect to the entirety of the boron carbide grain.

The preferable grain diameter of the initial injected silicon carbide that is a raw material for manufacturing the composite material in one embodiment of the invention varies according to the amount of boron carbide. That is, the grain diameter of the initial injected silicon carbide in the composite material is not different from the grain diameter of the silicon carbide powder used as a raw material, and this is thought to be because the initial injected silicon carbide powder does not react with silicon.

Accordingly, if the entirety of the 10-50 parts by volume that is the preferable volume fraction of grains of 10 μm or more is obtained from boron carbide, it is sufficient that the initial injected silicon carbide only includes the fine grain part of less than 10 μm, and if some thereof is obtained from silicon carbide, the initial injected silicon carbide requires the coarse grain part of 10 μm or more and fine grain part of less than 10 μm.

The average grain diameter of the silicon carbide that is preferable as the coarse grain part is from 20 μm to 100 μm, and if more than 100 μm, grindability of the composite material becomes bad. The average grain diameter of the initial injected silicon carbide that is preferable as the fine grain part is from 0.1 μm to 5 μm, and if less than 0.1 μm, it becomes difficult to make the highly-filled molded body in molding, and if more than 5 μm, grindability of the composite material lowers.

The preferable carbon source that is a raw material for manufacturing the composite material in one embodiment of the invention is carbon powder, and it is preferable that all of the grain diameters of the reaction sintered silicon carbide that is generated by reaction between the carbon and the silicon are substantially less than 10 μm.

As the carbon powder, all of carbon from that with very low crystallinity to graphite with very high crystallinity can be used. However, carbon with not so high crystallinity, which is generally referred to as carbon black, is easily obtainable. The preferable average grain diameter of carbon powder is from 10 nm to 1 μm.

The substantially entire amount of such carbon powder is presumed to be transformed into the reaction generated silicon carbide by the reaction with silicon in the reaction sintering step, and in the result of observation of the composite material, the carbon powder that was thought to be unreacted was not observed.

Moreover, as the carbon source, organic material can be used as well as the carbon powder. When organic material is used as the carbon source, it is necessary to select the organic material having a high residual carbon rate in the sintering step in a non-oxidizing atmosphere, and the particularly preferable organic material includes phenolic resin or furan resin. In the case that such organic material is used as the carbon source, the organic material can also be expected to function as a binder in the molding step or to function as a plasticity-providing agent or to function as a solvent for dispersing the powder.

The silicon that is a raw materials for manufacturing the composite material in one embodiment of the invention is molten and impregnated, and therefore its form such as powder form, granular form, and plate form is not limited, it is sufficient to use the silicon having the shape that can be disposed so as to be easily impregnated into the molded body.

Moreover, silicon occasionally includes a substance except for silicon as impurities. However, the amount of the silicon in the composite material in the invention is defined as the silicon matrix including the impurities.

As the impurities in the silicon, as well as the materials included inevitably on the process of manufacturing the. silicon, impurities such as B, Cl Al, Ca, Mg, Cu, Ba, Sr, Sn, Ge, Pb, Ni, Co, Zn, Ag, Au, Ti, Y, Zr, V, Cr, Mn, and Mo can also be intentionally added in order to lower the melting point of the silicon to lower the temperature of the reaction sintering step or in order to prevent reaction with boron carbide on the boron carbide surface or in order to prevent blowoff of the silicon from the reaction sintered body in cooling step after the reaction sintering or in order to control thermal expansion coefficient of the silicon or in order to provide conductivity to the composite material or the like.

The method for manufacturing a composite material in one embodiment of the invention includes: a molding step of manufacturing a molded body by molding a raw material having boron carbide, the initial injected silicon carbide, and a carbon source as main components; and a reaction sintering step of impregnating silicon into the molded body to transform the carbon into silicon carbide and thereby to fill the silicon in the void thereof.

The molding method in one embodiment of the invention is not particularly limited, and dry pressing, wet pressing, CIP, slip casting, injection molding, extrusion molding, plastic molding, vibration molding, and so forth can be selected according to shape or production volume of the target work.

Among them, slip casting is suitable for manufacturing products with large sizes and complex shapes.

When slip casting is adopted as the molding method in one embodiment of the invention, a organic solvent or water may be used as the solvent. However, considering simplification of the steps or influence on the earth's environment, it is preferable that water is used as the solvent.

In the case of slip casting by using water as the solvent, a slurry in which the boron carbide powder and the initial injected silicon carbide powder and the carbon source, which are raw materials, and water are mixed is first manufactured. And, in this case, additive such as dispersant or deflocculant for manufacturing the slurry with high concentration, binder, or plasticity-providing agent can also be added.

The preferable additive includes ammonium polycarboxylate, sodium polycarboxylate, sodium alginate, ammonium alginate, triethanolamine alginate, styrene-maleic acid copolymer, dibutylphthal, carboxylmethylcellulose, sodium carboxylmethylcellulose, ammonium carboxylmethylcellulose, methylcellulose, sodium methylcellulose, polyvinylalcohol, polyethylene oxide, sodium polyacrylate, oligomer of acrylic acid or its ammonium salt, various amines such as monoethylamine, pyridine, piperidine, tetra methylammonium hydroxide, dextrin, peptone, hydrosoluble starch, various resin emulsions such as acryl emulsion, various hydrosoluble resins such as resorcinol-type phenolic resin, various non-hydrosoluble resins such as novolac-type phenolic resin, and water glass.

When the non-hydrosoluble additive is added, it is preferable that the additive is set to be an emulsion or is coated on a powder surface, and moreover, when a crushing step is included as a step of manufacturing the slurry, it is preferable that the additive that is degraded by crushing is added after the crushing step.

Moreover, in slip casting step, both of gypsum slip casting by utilizing the capillary suction pressure of gypsum mold and pressure slip casting by directly applying pressure to the slurry are available. In the case of pressure slip casting, the appropriate pressure is from 0.1 MPa to 5 MPa.

In the molding step, it is important to manufacture the molded body having a high filling ratio. This is because the silicon is filled into the void of the molded body excluding the expansion volume part by transformation from the carbon into silicon carbide by the reaction with silicon. That is, the reaction sintered body manufactured from the highly-filled molded body has small silicon content, and the reaction sintered body with small silicon content can be expected to have the high specific rigidity.

The preferable filling ratio of the molded body is 60-80% and furthermore, preferably 65-75%.

The reason why the preferable filling ratio has the lower limit is that the silicon content of the reaction sintered body is set to be small as described above. However, the reason why the preferable filling ratio has the upper limit is that silicon is difficult to be impregnated into the molded body having a too high filling ratio. However, actually, it is difficult to industrially manufacture the molded body having such a high filling ratio, and therefore, it is sufficient to consider only the lower limit.

The above filling ratio of the molded body is the filling ratio of the respective powders of the boron carbide and the silicon carbide and the carbon, and the component such as the additive vaporizing by the calcinations step is excluded. Accordingly, in the case of using the additive having a residual carbon part such as phenolic resin, the residual carbon part is added as the filling ratio. For the specific measuring and display methods, the filing ratio of the molded body measured by Archimedes' method is shown to be F3, and the filling ratio that the vaporizing part is excluded therefrom is shown to be 173". and the preferable filling ratio of the molded body indicates the value of F3'.

In slip casting process, the slurry having small F1 that is the volume filling ratio of the powder in the slurry is not adequate for industrial production because the solvent part thereof absorbed into the mold is large, and therefore, it is preferable that F1 is 40% or more. Moreover, in general slip casting process, F3 or F3' of the pressure slip casting process is larger than that of gypsum slip casting process. However, in the invention, there is not large difference between the values of F3 or F3' of the pressure slip casting process and the gypsum slip casting process, and the gypsum slip casting that is suitable for manufacturing a wide variety of products in small quantities can be suitably adopted.

Between the molding step and the reaction sintering step of the composite material in one embodiment of the invention, a calcination step can also be provided.

When the molded body has a small size and a simple shape, the calcinations step is not occasionally required. However, when the molded body has a large size and a complex shape, it is preferable to provide the calcinations step for preventing break of the molded body in handling and generation of cracks in the reaction sintering.

As the calcinations temperature, the preferable temperature is 1000-2000° C., and if the temperature is lower than 1000° C., the effect of calcination cannot be expected and if the temperature is higher than 2000° C., sintering starts and thereby the work is contracted, and there is fear that the advantage as the near-net-shape manufacturing process which is a characteristic of the manufacturing process of the present composite material and in which the sintering contraction is almost zero is lost. Moreover, the preferable atmosphere in the calcination step is non-oxidizing atmosphere.

The calcinations step is generally performed in combination with a degreasing step of the molded body. However, if contamination of the furnace is feared, the degreasing step may be separately provided before the calcination step.

Moreover, only the degreasing step may be provided without the calcination step. In this case, it is sufficient to adopt the degreasing temperature required for degradation and removal of the binder part.

The preferable reaction sintering temperature in the subsequent silicon-impregnating reaction sintering step is from the melting point of silicon to 1800° C. As the work is larger and has a more complex shape, the impregnation of silicon becomes difficult, and therefore, it is necessary to set the reaction sintering temperature to be high and to set the time holding the maximum temperature to be long. However, it is preferable that the reaction sintering temperature is low and the maximum-temperature-holding time is short as much as possible, in the range that reaction sintering in which the carbon transforms into the silicon carbide completely progresses and that the silicon is completely impregnated and thereby the void comes to disappear.

Because the melt point of silicon is 1414° C., the reaction sintering temperature of 1430° C. or more is generally required. However, if impurities are added to the silicon to lower the melt point, the reaction sintering temperature can be lowered to about 1350° C.

As described above, as to the composite material in one embodiment of the invention, the composition ratio of the reaction sintered body can be defined by the mixing ratio of the raw materials of the molded body and measurement of the filling ratio F3' of the molded body, because the carbon in the molded body expands by the reaction with the silicon into silicon carbide, and the silicon comes to fill the void thereof.

Moreover, by the fine structure observation of the reaction sintered body shown in Examples to be described later, the coarse grain boron carbide, the coarse grain silicon carbide, the fine grain silicon carbide and the silicon filling the gap among the grains, that were components composing the reaction sintered body, could be identified. And their volume ratios were obtained by averaging the area ratios of these components in 10 images or more, and the obtained volume ratios of the respective components corresponded to the values calculated from the mixing ratio of raw materials of the molded body.

The black parts of FIG. 3, which is a photograph of the fine structure to be described later, are grains of boron carbide or silicon carbide, and the white parts are silicon, and therefore, the identification between the grain and the silicon and the identification between the coarse grain and the fine grain are easy. Moreover, the identification between the coarse grain silicon carbide and the coarse grain boron carbide can be easily performed by SEM•EPMA analysis.

As described above, the composition ratio of the raw materials for realizing the composition ratio of the composite material in one embodiment of the invention can be obviously calculated from the composition ratio of the target composite material and the expected filling ratio of the molded body. However, the preferable mixing ratio of each of the raw materials is 0-45 parts by weight of the carbon source, with respect to the total 100 parts by weight of the 10-90 parts by weight of boron carbide and the 90-10 parts by weight of initial injected silicon carbide.

Here, the part by weight of the carbon source is the weight of the carbon when the carbon source is converted into carbon, and in the case of using the carbon powder, the mixing weight itself is used, and in the case of utilizing the additive having the residual carbon part, the value that is the mixing weight multiplied by the residual carbon ratio is used.

The problems caused when each of the components of boron carbide and silicon carbide departs from the preferable composition range of the raw materials are the same as the problems caused when each of the components of boron carbide and silicon carbide that are constituents of the above composite material departs from the preferable range.

Zero parts by weight of the carbon is possible, but because the reaction with the expansion by the reaction of the carbon with the silicon cannot be utilized in this case, it becomes difficult to completely fill the void of the molded body with the silicon, and there is danger that the void remains. If the carbon part is too large, there is danger that cracks are generated in the reaction sintered body by the expansion reaction.

Therefore, the further preferable mixing ratio of the carbon source is 10-40 parts by weight with respect to the total 100 parts by weight of the boron carbide and the initial injected silicon carbide. Moreover, the preferable silicon amount required for the reaction sintering is 105-200% of the silicon amount required for making the carbon transform into silicon carbide and further completely filling the void, and further preferably, 110-150%, and the amount is appropriately adjusted by size and shape of the molded body.

The preferable specific rigidity of the composite material in one embodiment of the invention is 130 GPa or more, and further preferably, 140 GPa or more.

Because one of the object of the invention is to provide the composite material having the high specific rigidity, there is no preferable upper limit, but realistically, it is difficult to make the composite material having the specific rigidity ratio of 200 GPa or more, and for achieving the high specific rigidity with holding the excellent grindability, about 170 GPa is the upper limit.

The composite material in one embodiment of the invention is suitably applied to products requiring high specific rigidity and also requiring precise grinding or to products with large grinding cost because of large sizes and complex shapes. In particular, the preferable application example to products includes semiconductor or liquid crystal-manufacturing device members. Among them, the particular preferable application example to products includes members for exposure devices, and by using the composite material as a wafer-supporting member such as a susceptor or a stage or as an optical support member such as a reticle stage, the positioning accuracy of the exposure device can be improved, and by shortening the positioning time, the through-put of the device can be improved.

EXAMPLE

Hereinafter, one embodiment of the invention will be described with reference to table and drawings.

In Table 1, a view of Examples and Comparative examples to be described below is shown.

The slurry concentrations in the respective mixing examples are shown in F1 of Table 1. Moreover, the addition amounts of binder in the respective mixing examples are shown by the difference between F3' and F3. Moreover, for the reaction sintered body of each of them, after removing the excess silicon in the surface, a test piece was sliced and the surface thereof was polished, and then, specific gravity was measured by Archimedes' method, and Young's modulus was measured by a resonance method, and the specific rigidity was calculated.

Moreover, the reaction sintered body subjected to surface treatment was disposed on a dynamometer (manufactured by Kistler Co., Ltd., Model Number 9256C2), and a hole with a depth of 4 mm was processed by a core drill with cp 10 mm (#60, manufactured by Asahi Diamond Industrial Co., Ltd.) at a frequency of 100 m/min, (3200 rpm) at a feed speed of 2 mm/min at a step amount of 0.2 mm, and the processing resistance was measured and the chipping state around the hole was confirmed. For the evaluation of machinability, the case that the maximum value of the processing resistance is 2000 N or more is X, and the case of 1500-2000 N is A, the case of less than 1500 N is 0. Thereby, the evaluation was performed.

However, even when the maximum resistance Is A or X, in the case that the processing resistance lowers in a short time to be stable at the low value, the evaluation was performed at the low value. Moreover, even when the processing resistance is 0 or 4, the case that cracks presumed to be due to processing are generated in processing and the case that tool break is caused are X.

For the evaluation of state of chipping, the case that chip of the periphery of the hole is less than 0.3 mm is 0, and the case of 0.3 mm or more and less than 0.5 mm is A, and the case of 0.5 mm or more is X. Moreover, for the observation of the fine structure, the sintered body was sliced into appropriate sizes, and a surface thereof was lapped by an abrasive grain of 1 μm, and observed by an optical microscope with setting it to ×2800 magnification.

Figure 1:
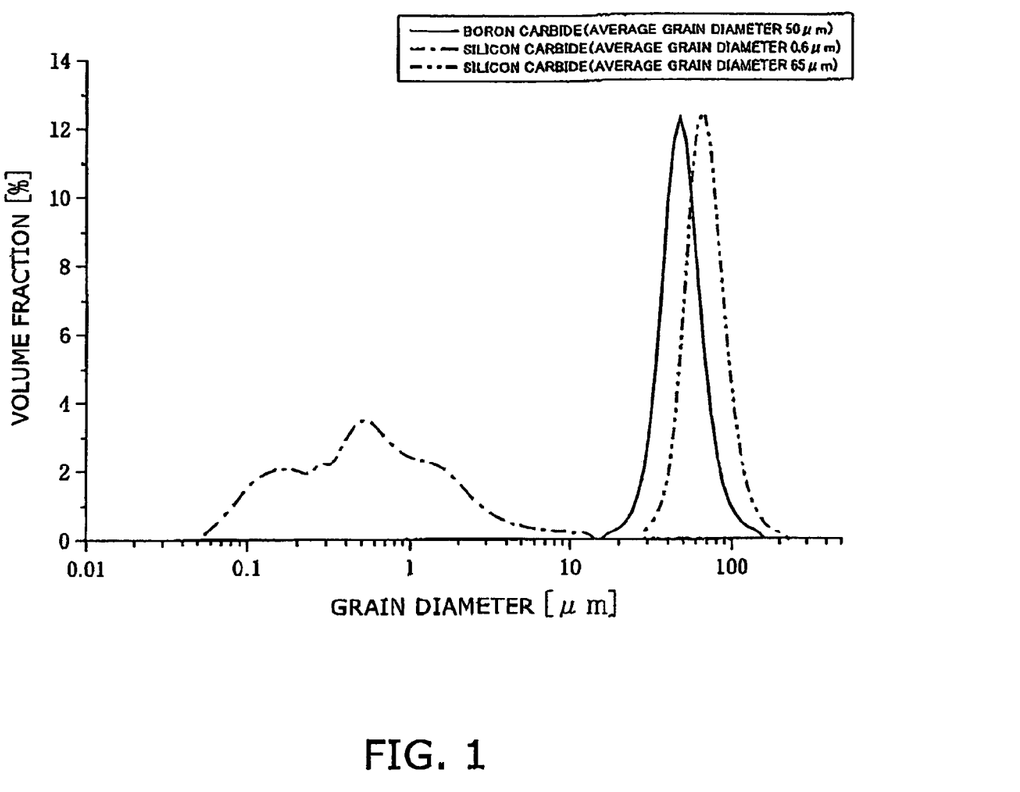
FIG. 1 is a view showing the grain size distribution of the raw material used in an example of the invention.

In FIG. 1, grain-size distribution measurement results, of the coarse grain boron carbide having an average grain diameter of 50 μm, the coarse grain silicon carbide having an average grain diameter of 65 μm, and the fine grain silicon carbide having an average diameter of 0.6 μm, which were used in carrying out the invention, are shown. The grain-size distribution measurement was performed by a laser grain-size analyzer (manufactured by Nikkiso Co., Ltd., MT3000), and the above average grain diameter indicates volume average diameter.

As shown in FIG. 1, the coarse grain powder does not substantially include grains of 10 μm or less, and the fine grain powder does not substantially include the coarse grain part of 10 μm or more.

Figure 2:
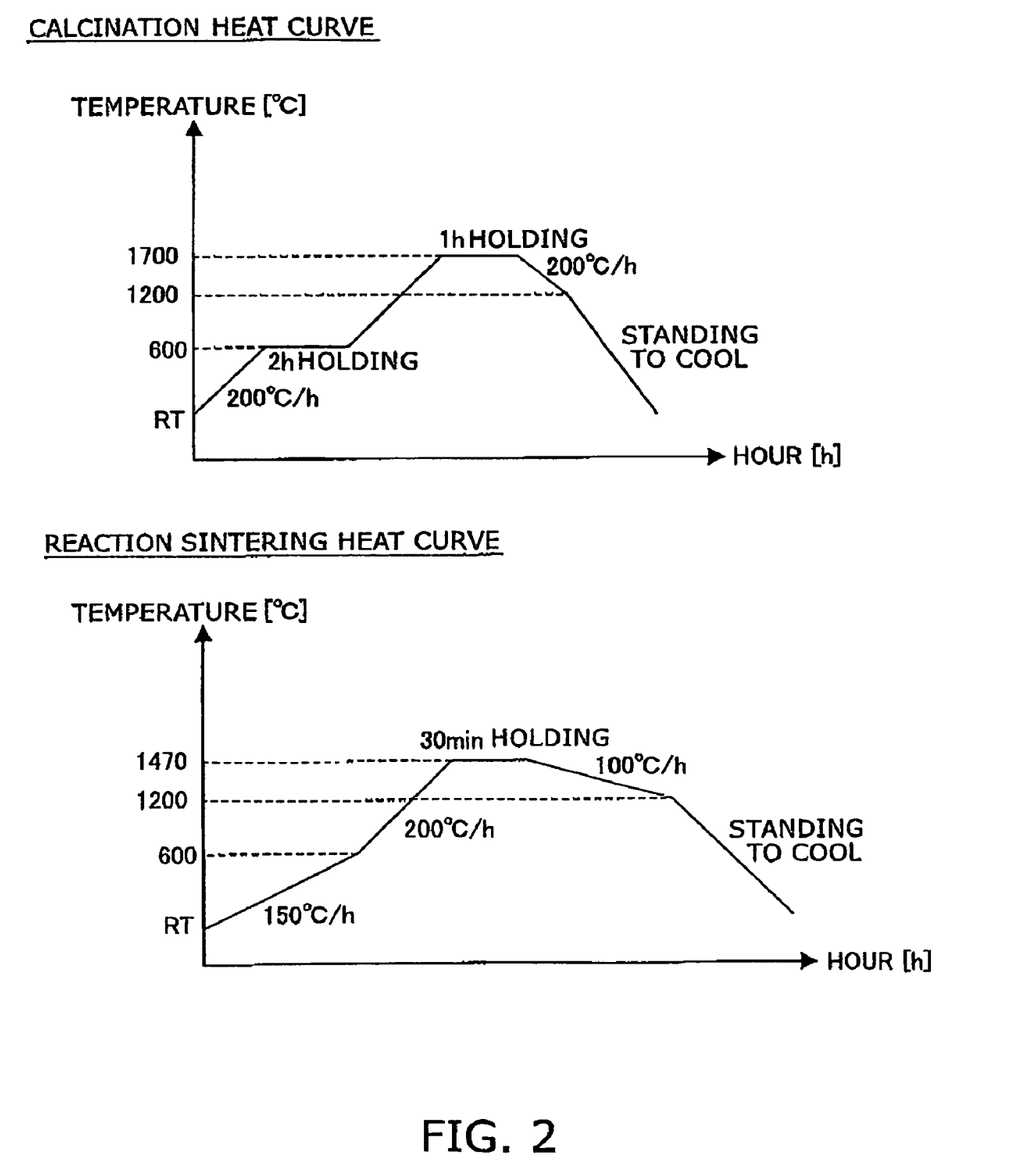
FIG. 2 is a view showing the heat curve of the calcination process used in an example of the invention.

In FIG. 2, a graph showing a heat curve of the calcinations and reaction sintering is shown.

Figure 3:
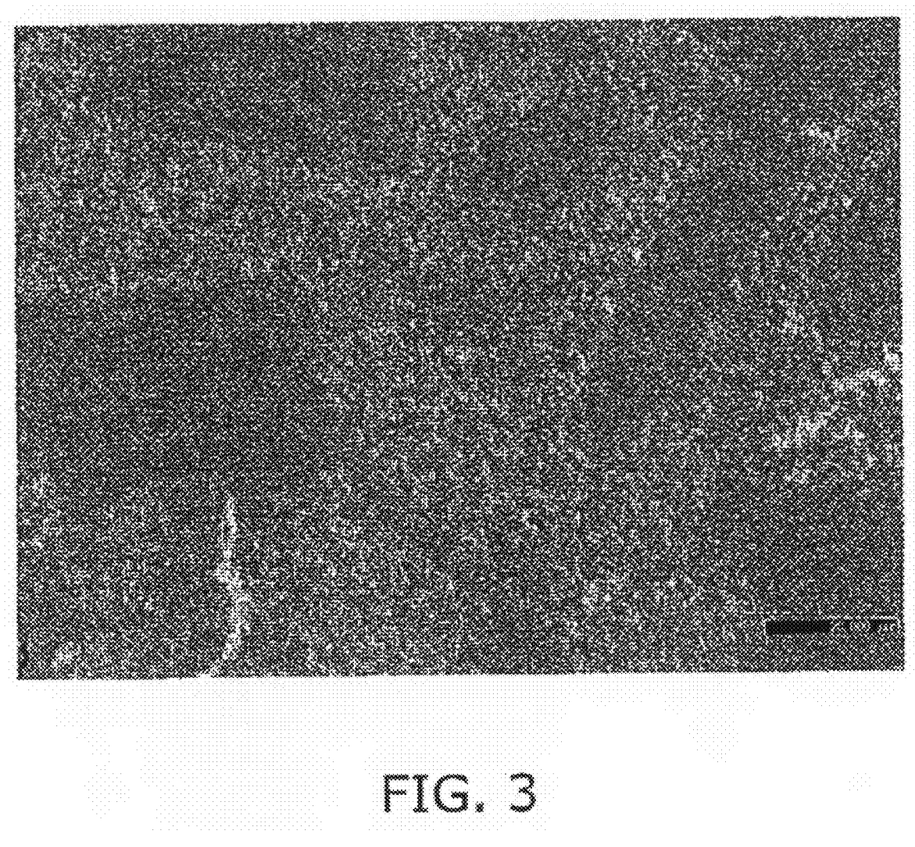
FIG. 3 is a view showing the fine structure of the reaction sintered body of an example of the invention.

In FIG. 3, the optical microscopic image of the fine structure of the reaction sintered body of Example 2 is shown. As described above, the identification between the coarse grain of 10 μm or more and the fine grain of 10 μm or less was easy.

Examples 1-3

30 parts by weight of silicon carbide powder having an average grain diameter of 0.6 μm, 70 parts by weight of boron carbide powder having an average grain diameter of 50 μm, and 10-30 parts by weight of carbon black powder having an average grain diameter of 55 nm were injected and dispersed in pure water to which a dispersant of 0.1-i part by weight with respect to the silicon carbide powder, the boron carbide powder, and the carbon black powder was added, and pH was adjusted to 8-9.5 by ammonia water or the like, and thereby, the slurry having a low viscosity of less than 500 CP was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 mm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of $1\times10^{-4}$-$1\times10^{-3}$ torr and degreased, and then held for 1 hour at 1700° C. and thereby calcined. After calcination, the temperature was heated to 1470° C. and held for 30 min, and molten silicon was impregnated into the molded body, and thereby, the reaction sintered body was manufactured. In Examples 1 to 3, the additional amounts of the carbon black powder were 10, 20, and 30 parts by weight, respectively.

Example 4

20 parts by weight of silicon carbide powder having an average grain diameter of 0.6 μm, 30 parts by weight of silicon carbide powder having an average grain diameter of 65 µm, 50 parts by weight of boron carbide powder having an average grain diameter of 50 µm, and 30 parts by weight of carbon black powder having an average grain diameter of 55 nm were injected and dispersed in pure water to which a dispersant of 0.1-1 part by weight with respect to the silicon carbide powder, the boron carbide powder, and the carbon black powder was added, and pH was adjusted to 8-9.5 by ammonia water or the like, and thereby, the slurry having a low viscosity of less than 500 CP was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 mm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of $1\times10^{-4}$-$1\times10^{-3}$ torr and degreased, and then held for 1 hour at 1700° C. and thereby calcined. After calcination, the temperature was heated to 1470° C. and held for 30 min, and molten silicon was impregnated into the molded body, and thereby, the reaction sintered body was manufactured.

Example 5

25 parts by weight of silicon carbide powder having an average grain diameter of 0.6 µm, 25 parts by weight of silicon carbide powder having an average grain diameter of 65 µm, 50 parts by weight of boron carbide powder having an average grain diameter of 50 µm, and 10 parts by weight of carbon black powder having an average grain diameter of 55 nm were injected and dispersed in pure water to which a dispersant of 0.1-1 part by weight with respect to the silicon carbide powder, the boron carbide powder, and the carbon black powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 mm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of $1\times10^{-4}$-$1\times10^{-3}$ torr and degreased, and held for 1 hour at 1700° C. and thereby calcinated. After calcinations, the temperature was heated to 1470° C. and held for 30 min, and molten silicon was impregnated into the molded body, and thereby, the reaction sintered body was manufactured.

Example 6

25 parts by weight of silicon carbide powder having an average grain diameter of 0.6 µm, 25 parts by weight of silicon carbide powder having an average grain diameter of 65 µm, 50 parts by weight of boron carbide powder having an average grain diameter of 50 µm, and 20 parts by weight of carbon black powder having an average grain diameter of 55 nm were. injected and dispersed in pure water to which a dispersant of 0.1-1 part by weight with respect to the silicon carbide powder, the boron carbide powder, and the carbon black powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 mm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of $1\times10^{-4}$-$1\times10^{-}$ torr and degreased, and then held for 1 hour at 1700° C. and thereby calcined. After calcination, the temperature was heated to 1470° C. and held for 30 min, and molten silicon was impregnated into the molded body, and thereby, the reaction sintered body was manufactured.

Example 7

50 parts by weight of silicon carbide powder having an average grain diameter of 0.6 µm and 50 parts by weight of boron carbide powder having an average grain diameter of 50 µm were injected and dispersed in pure water to which a dispersant of 0.1-1 part by weight with respect to the silicon carbide powder and the boron carbide powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder, the boron carbide, powder, and the carbon black powder was added thereto and mixed, and then, the slurry was defoamed, and an acrylic pipe having an inner diameter of 80 mm is put on a gypsum plate, and the slurry was case, and thereby, the molded body having a thickness of approximately 10 mm was produced. The molded body was naturally dried and then dried at 100-150° C. and then held for 2 hours at a temperature of 600° C. under reduced pressure of $1\times10^{-4}$ $^{7}\times10^{-3}$ torr and degreased, and then held for 1 hour at 1700° C. and thereby calcined. After calcinations, the temperature was heated to 1470° C. and held for 30 min, and molten silicon was impregnated into the molded body, and thereby, the reaction sintered body was manufactured.

Example 8

80 parts by weight of silicon carbide powder having an average grain diameter of 0.6 µm, 20 parts by weight of boron carbide powder having an average grain diameter of 50 µm, and 10 parts by weight of carbon black powder having an average grain diameter of 55 nm were injected and dispersed in pure water to which a dispersant of 0.1-1 part by weight with respect to the silicon carbide powder, the boron carbide powder, and the carbon black powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 mm is put on a gypsum plate, and the, slurry was cast, and thereby, the molded body having a thickness of approximately 10 mm was produced. The molded body was naturally dried and then dried at 100-150°

C. and then held for 2 hours at a temperature of 600° C. under reduced pressure of 1×10⁻⁴ 1×10⁻³ torr and degreased, and then held for 1 hour at 1700° C. and thereby calcined. After calcination, the temperature was heated to 1470° C. and held for 30 min, and molten silicon was impregnated into the molded body, and thereby, the reaction sintered body was manufactured.

Comparative Example 1

30 parts by weight of silicon carbide powder having an average grain diameter of 0.6 µm and 70 parts by weight of boron carbide powder having an average grain diameter of 50 µm where injected and dispersed in pure water to which a dispersant of 0.1-1 part by weight with respect to the silicon carbide powder and the boron carbide powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder and the boron carbide powder was added thereto and mixed, and then, the slurry was defoamed, and an acryl pipe having an inner diameter of 80 mm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of 1×10⁻⁴-1×10⁻³ torr and degreased, and then held for 1 hour at 1700° C. and thereby calcined. After calcination, the temperature was heated to 1470° C. and held for 30 min, and molten silicon was impregnated into the molded body, and thereby, the reaction sintered body was manufactured.

Comparative Example 2

50 parts by weight of silicon carbide powder having an average grain diameter of 0.6 µm, 50 parts by weight of boron carbide powder having an average grain diameter of 50 µm, and 50 parts by weight of carbon powder having an average grain diameter of 55 nm were injected and dispersed in pure water to which a dispersant of 0.1-1 part by weight with respect to the silicon carbide powder, the boron carbide powder, and the carbon black powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 nm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of 1×10⁻⁴-1×10⁻³ torr and degreased, and then held for 1 hour at 1700° C. and thereby calcined. After calcination, the temperature was heated to 1470° C. and held for 30 min, and molten silicon was impregnated. into the molded body, and thereby, the reaction sintered body was manufactured.

Comparative Example 3

80 parts by weight of silicon carbide powder having an average grain diameter of 0.6 µm, 20 parts by weight of boron carbide powder having an average grain diameter of 4 µm, and 50 parts by weight of carbon black powder having an average grain diameter of 55 nm were injected and dispersed in pure water to which a dispersant of 0.1-1 part by weight with respect to the silicon carbide powder, the boron carbide powder, and the carbon black powder was added, and pH was adjusted to 8-9.5 by ammonia water or the like, and thereby, the slurry having a low viscosity of less than 500 cp was produced. The slurry was mixed for some hours in a pot mill or the like, and then, a binder of 1-2 parts by weight with respect to the silicon carbide powder, the boron carbide powder, and the carbon black powder was added thereto and mixed, and then, the slurry was defoamed, and an acrylic pipe having an inner diameter of 80 mm is put on a gypsum plate, and the slurry was cast, and thereby, the molded body having a thickness of approximately 10 mm was produced. The molded body was naturally dried and then dried at 100-150° C. and then held for 2 hours at a temperature of 600° C. under reduced pressure of 1×10⁻⁴-1×10⁻³ torr and degreased, and then held for 1 hour at 1700° C. and thereby calcined. After calcination, the temperature was heated to 1470° C. and held for 30 min, and molten silicon was impregnated into the molded body, and thereby, the reaction sintered body was manufactured.

In Examples 1-8, the specific rigidity was 130 GPa or more, and the grinding resistance was small, and chipping was difficult to be caused, and therefore, the composite material excellent in grinding workability could be manufactured.

In Comparative example 1, the grinding resistance is large and chipping was also easily caused, and therefore, the grinding workability was inferior.

In Comparative example 2, fine cracks were caused in the composite material, and the specific rigidity lowered, and chipping was easily generated in grinding.

In Comparative example 3, the specific rigidity of the composite material was small, and chipping easily generated in grinding.

TABLE 1

| | SILICON [vol %] | SILICON CARBIDE | | | BORON CARBIDE [vol %] | VOLUME RATIO OF COARSE GRAIN [vol %] | CHARACTERISTICS OF SLURRY AND MOLDED BODY F1 |
| --- | --- | --- | --- | --- | --- | --- | --- |
| | | FINE GRAIN [vol %] | COARSE GRAIN [vol %] | ENTIRETY [vol %] | | | |
| EXAMPLE 1 | 19.3 | 34.6 | 0.0 | 34.6 | 46.2 | 46.2 | 0.55 |
| EXAMPLE 2 | 17.3 | 44.6 | 0.0 | 44.6 | 38.1 | 38.1 | 0.45 |
| EXAMPLE 3 | 14.7 | 46.9 | 5.6 | 52.4 | 32.9 | 38.4 | 0.45 |
| EXAMPLE 4 | 12.3 | 50.1 | 12.5 | 62.6 | 25.1 | 37.6 | 0.45 |
| EXAMPLE 5 | 19.0 | 32.1 | 14.4 | 46.5 | 34.6 | 48.9 | 0.50 |
| EXAMPLE 6 | 15.1 | 43.7 | 12.1 | 55.8 | 29.1 | 41.2 | 0.50 |
| EXAMPLE 7 | 27.6 | 31.8 | 0.0 | 31.8 | 40.6 | 40.6 | 0.57 |

TABLE 1-continued

|  | | | | | | | |
|---|---|---|---|---|---|---|---|
| EXAMPLE 8 | 22.3 | 63.4 | 0.0 | 63.4 | 14.3 | 14.3 | 0.45 |
| COMPARATIVE EXAMPLE 1 | 30.8 | 17.4 | 0.0 | 17.4 | 51.9 | 51.9 | 0.60 |
| COMPARATIVE EXAMPLE 2 | 17.3 | 65.1 | 0.0 | 65.1 | 17.6 | 17.6 | 0.45 |
| COMPARATIVE EXAMPLE 3 | 25.8 | 67.3 | 0.0 | 67.3 | 6.8 | 0.0 | 0.35 |

| CHARACTERISTICS OF SLURRY AND MOLDED BODY | | PHYSICAL PROPERTY VALUE | | | WORKABILITY | |
|---|---|---|---|---|---|---|
| F3 | F3' | SPECIFIC GRAVITY | YOUNG'S MODULUS [Gpa] | SPECIFIC RIGIDITY | MACHINABILITY | CHIPPING |
| EXAMPLE 1 | 0.765 | 0.726 | 2.73 | 397 | 145.7 | ○ | ○ |
| EXAMPLE 2 | 0.725 | 0.689 | 2.78 | 394 | 141.7 | ○ | ○ |
| EXAMPLE 3 | 0.707 | 0.672 | 2.84 | 400 | 141.1 | ○ | ○ |
| EXAMPLE 4 | 0.721 | 0.680 | 2.91 | 395 | 136.0 | Δ | Δ |
| EXAMPLE 5 | 0.766 | 0.725 | 2.81 | 393 | 140.0 | Δ | ○ |
| EXAMPLE 6 | 0.742 | 0.704 | 2.86 | 400 | 140.0 | Δ | ○ |
| EXAMPLE 7 | 0.767 | 0.730 | 2.68 | 360 | 134.7 | ○ | ○ |
| EXAMPLE 8 | 0.730 | 0.690 | 2.91 | 379 | 130.2 | ○ | ○ |
| COMPARATIVE EXAMPLE 1 | 0.732 | 0.692 | 2.55 | 343 | 134.5 | X | X |
| COMPARATIVE EXAMPLE 2 | 0.620 | 0.592 | 2.94 | 353 | 120.1 | Δ | X |
| COMPARATIVE EXAMPLE 3 | 0.557 | 0.531 | 3.00 | 347 | 115.9 | Δ | X |

What is claimed is:

1. A composite material comprising X parts by volume of boron carbide, Y parts by volume of silicon carbide, and Z parts by volume of silicon as main components, $10<X<60$, $20<Y<70$, and $5<Z<30$ being satisfied, grains of 10 μm or more of the boron carbide and the silicon carbide being 10-50 parts by volume, and a specific rigidity of the composite material is 130 GPa or more.

2. The composite material according to claim 1, wherein the composite material is formed by a reaction sintering step of impregnating molten silicon into a molded body molded by using a raw material having boron carbide, silicon carbide, and a carbon source as main components, to transform carbon of the carbon source into silicon carbide.

3. The composite material according to claim 2, wherein the carbon source includes a carbon powder as a main component.

4. The composite material according to claim 3, wherein the carbon source further includes a resin component as another main component.

5. The composite material according to claim 2, wherein formation of the composite material involves a step of calcination of the molded body between a molding step of the molded body and the reaction sintering step.

6. The composite material according to claim 2, wherein a molding method of the molded body is slip casting in which water is used as a solvent.

7. The composite material according to claim 2, wherein a filling ratio of the molded body in a molding step is 60-80%.

* * * * *